(12) United States Patent
Marks

(10) Patent No.: US 7,178,947 B2
(45) Date of Patent: Feb. 20, 2007

(54) LIGHTING DEVICE WITH ELLIPTICAL FRESNEL MIRROR

(76) Inventor: Dale Marks, 7520 Brompton, #719, Houston, TX (US) 77025

(*) Notice: Subject to any disclaimer, the term of this patent is extended or adjusted under 35 U.S.C. 154(b) by 103 days.

(21) Appl. No.: 10/860,999

(22) Filed: Jun. 4, 2004

(65) Prior Publication Data

US 2005/0270781 A1 Dec. 8, 2005

(51) Int. Cl.
*F21V 7/00* (2006.01)
(52) U.S. Cl. ............. 362/298; 362/285; 362/341; 362/355; 362/362
(58) Field of Classification Search ........... 362/298, 362/299, 285, 341, 346, 347, 355, 362, 296, 362/297, 413; 359/726, 742, 811
See application file for complete search history.

(56) References Cited

U.S. PATENT DOCUMENTS

| | | | |
|---|---|---|---|
| 3,058,394 A | 10/1962 | Edlin | |
| 3,428,800 A | 2/1969 | Levin et al. | |
| 3,702,930 A * | 11/1972 | Joel | 362/291 |
| 4,110,009 A | 8/1978 | Bunch | |
| 4,131,336 A | 12/1978 | Frosch et al. | |
| 4,263,641 A | 4/1981 | Ferrero | |
| 4,286,312 A * | 8/1981 | Benoit | 362/309 |
| 4,460,946 A * | 7/1984 | Tinz | 362/319 |
| 4,510,560 A | 4/1985 | Negishi | |
| 4,616,293 A * | 10/1986 | Baliozian | 362/7 |
| 4,784,483 A * | 11/1988 | Holladay et al. | 351/243 |
| 4,809,147 A | 2/1989 | Negishi | |
| 4,875,748 A * | 10/1989 | Matsumoto et al. | 359/218 |
| 4,914,553 A | 4/1990 | Hamada et al. | |
| 4,974,138 A | 11/1990 | Negishi | |
| 5,087,116 A | 2/1992 | Taylor, II | |
| 5,555,135 A | 9/1996 | Uemura | |
| 5,595,440 A * | 1/1997 | Gordin et al. | 362/247 |
| 5,844,730 A | 12/1998 | Aikawa et al. | |
| 5,904,417 A | 5/1999 | Hewett | |
| 5,933,210 A * | 8/1999 | Ron | 351/246 |
| 6,113,252 A | 9/2000 | Arlitt et al. | |
| 6,123,429 A | 9/2000 | Osawa | |
| 6,152,589 A | 11/2000 | Kawaguchi et al. | |
| 2004/0121669 A1* | 6/2004 | Shofer | 440/101 |

FOREIGN PATENT DOCUMENTS

RU 2108606 * 11/1995

OTHER PUBLICATIONS

Fresnel Lenses—Copyright Fresnel Technologies, Inc., 2001, pp. 1-12.
Focal Lenght of a Lens, Aug. 22, 2003, 4 Pgs. www.hyperphysics.phy-ast.gsu.edu.

* cited by examiner

*Primary Examiner*—Sandra O'Shea
*Assistant Examiner*—Mark Tsidulko
(74) *Attorney, Agent, or Firm*—Notaro & Michalos PC

(57) ABSTRACT

A lighting device has a Fresnel mirror with a reflective surface for reflecting light emitted by a light source onto a target. The reflective surface is defined by an elliptical curve. The light source is disposed at approximately the first focal point of an ellipse formed by the elliptical curve. A mechanism adjusts the functional relationship between the Fresnel mirror and the light source so that the light source can be positioned approximately at the first focal point of the ellipse.

14 Claims, 12 Drawing Sheets

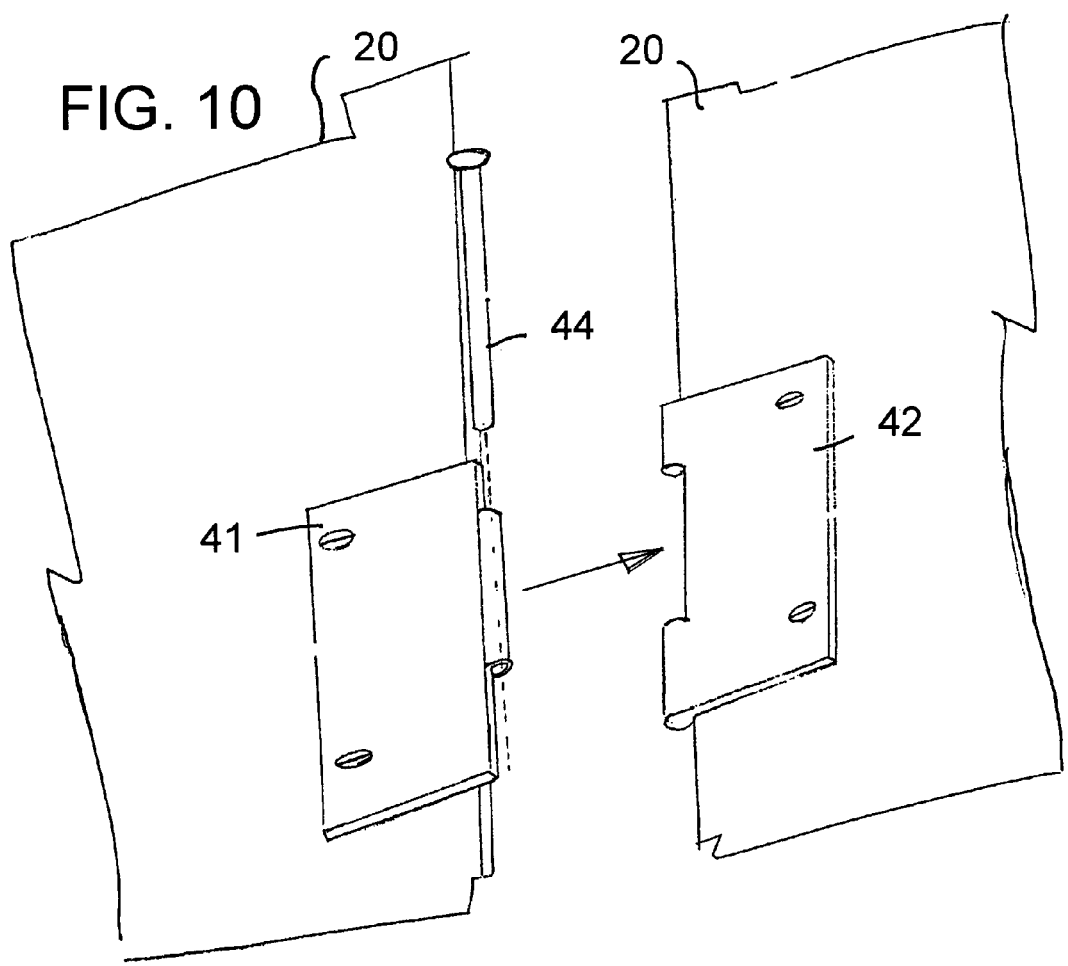

US 7,178,947 B2

LIGHTING DEVICE WITH ELLIPTICAL FRESNEL MIRROR

FIELD AND BACKGROUND OF THE INVENTION

The present invention relates generally to the field of lighting devices and in particular to projection lighting used for emitting soft light onto targets, such as statues, artwork, landscaping, displayed products, film and video production, photography, etc.

Projection lighting used for spot and floor lighting applications is well known in the art. It is unknown, however, to use projection lighting for soft lighting of a subject.

Lighting fixtures generally include a housing, a reflector, a conventional bulb, and a lens or window. Many configurations are known, each of which provides a different lighting effect. The reflector typically has a reflective mirror which faces the illuminated target area. Reflectors with elliptical-shaped surfaces are also commonly known.

U.S. Pat. No. 5,904,417 to Hewett is directed to a lighting apparatus consisting of an arc lamp, an elliptical reflector which completely surrounds the arc lamp, at least one lens which is positioned in front of the arc lamp and the reflector and a shutter which dims the amount of light that emanates from the arc lamp. The arc lamp and reflector are disposed at a fixed distance to one another.

U.S. Pat. No. 4,110,009 to Bunch discloses multiple parabolic Fresnel reflectors that are gimbaled to follow the sun.

An elaborate multi-piece light source device having a discharge lamp, an elliptical mirror reflector which surrounds the discharge lamp and a mechanism for changing the position of the discharge lamp is disclosed in U.S. Pat. No. 6,123,429 to Osawa.

It would be desirable to provide a soft light-producing device which concentrates soft light to a well defined local area, and which has a minimal number of pieces, is adjustable to provide a range of light rays, and does not have components which are intricate and difficult to operate and expensive to manufacture and maintain. These problems and deficiencies exist in the prior art and are solved by the present invention in the manner described below.

SUMMARY OF THE INVENTION

It is an object of the present invention to provide a lighting device which comprises a light source, a Fresnel mirror having an elliptical reflective surface, a preferably hemispherical reflector disposed between the light source and an illuminated target and a means for adjusting the functional spatial relationship between the light source and the Fresnel mirror, and a structure for holding together the pieces of the Fresnel mirror in proper, e.g. co-planar, alignment. The light source is approximately disposed at a first focal point of concentric ellipses forming the reflective surface of the elliptical Fresnel mirror. The reflector partially surrounds the light source and reflects light emitted from the light source toward the Fresnel mirror. The adjusting means adjusts the functional spatial relationship between the light source that includes the reflector, and the Fresnel mirror so that the illuminated target, located approximately at the second focal point of the ellipse, is bathed in soft light.

It is another object of the present invention that the Fresnel mirror of the lighting device has at least two sections which are pivotally connected to each other so that the Fresnel mirror can be folded for easy transport and compact storage.

It is still another object of the invention that the lighting device also include a panel for removably mounting the Fresnel mirror so that the Fresnel mirror can be switched with other Fresnel mirrors which have different focal lengths.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 10 is a perspective view of a hinge device of the invention;

DESCRIPTION OF THE PREFERRED EMBODIMENTS

Figure 1:
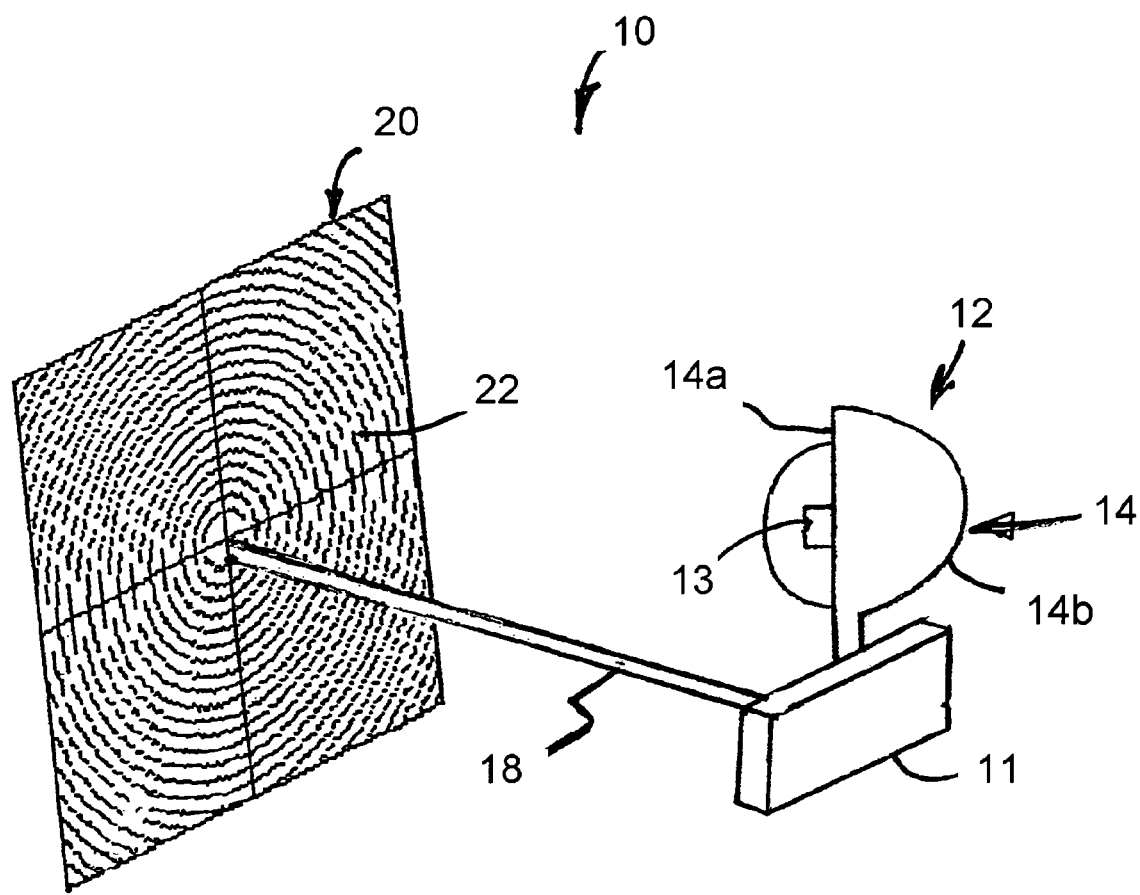
FIG. 1 is a perspective view of the invention.

Referring now to the drawings, in which like reference numerals are used to refer to the same or similar elements, FIG. 1 shows a lighting device generally designated 10, comprising a light source 12 with light filament 13, a reflector 14 surrounding at least a portion of light source 12, a Fresnel mirror 20 disposed in a functional spacial relationship relative to light source 12 and a linking mechanism or strut 18 which connects the light source 12 and Fresnel mirror 20, and may be adjustable.

Light source 12, for example, a conventional filament lamp or a discharge arc lamp or a fluorescent lamp or flash-tube or other light source, emits uniform intensity light in all directions. A power source such as a ballast or trigger circuitry or other power source for light source 12 is shown schematically at 11. The light source can be powered by direct voltage, i.e., battery, or alternating circuit via an electrical power cord and plug (not shown).

Figure 2:
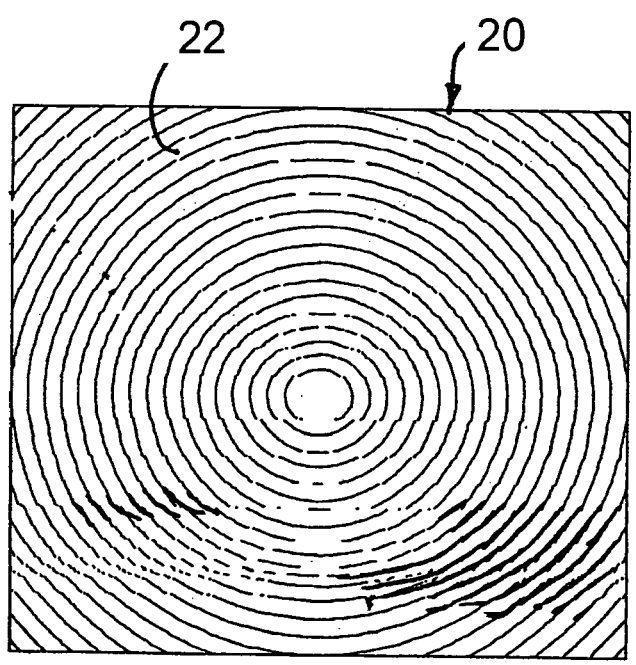
FIG. 2 is a front view of the Fresnel mirror of the invention.
Figure 3:
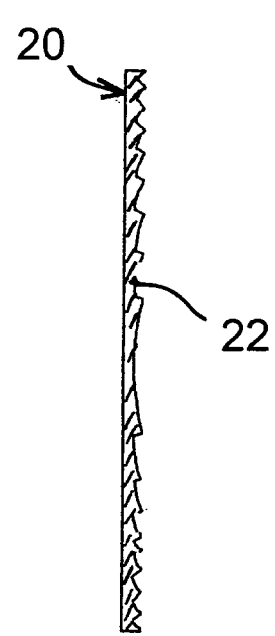
FIG. 3 is a cross-sectional view of the Fresnel mirror of the invention.
Figure 16:
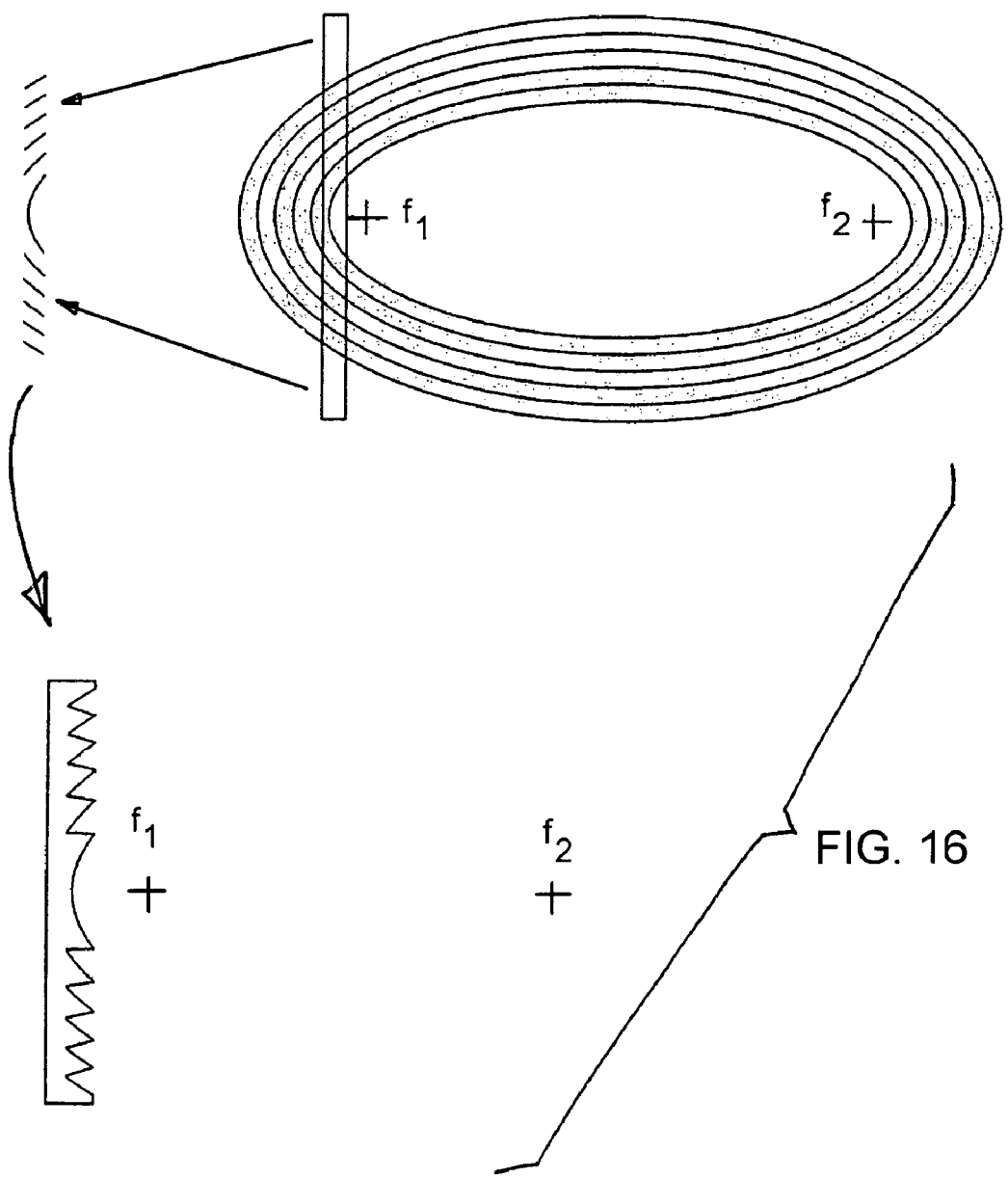
FIG. 16 is an explanatory view of how the elliptical Fresnel mirror of the invention is constructed.

As shown in FIG. 2, Fresnel mirror 20, which is produced by depositing a reflective membrane onto an elliptical Fresnel panel and by applying a protective membrane thereto, has preferably a square shape, but can also have other geometric shapes, such as, for example, rectangular, circular or hexagonal. Fresnel mirror 20 is generally flat but, as shown in FIG. 3, has a reflective surface 22 which is defined by concentric projections each of an elliptical shape. FIG. 16 illustrates this construction of the Fresnel mirror in greater detail. Although concentric surfaces are shown, each with an increment of elliptical reflective surface to create a 360 degree elliptical reflector, the elliptical surfaces may be straight parallel segments for creating a 180 degree elliptical reflector.

Reflective surface 22 of Fresnel mirror 20 faces light source 12. Unlike structures of typical light sources, Fresnel mirror 20 does not surround light source 12.

Figure 4:
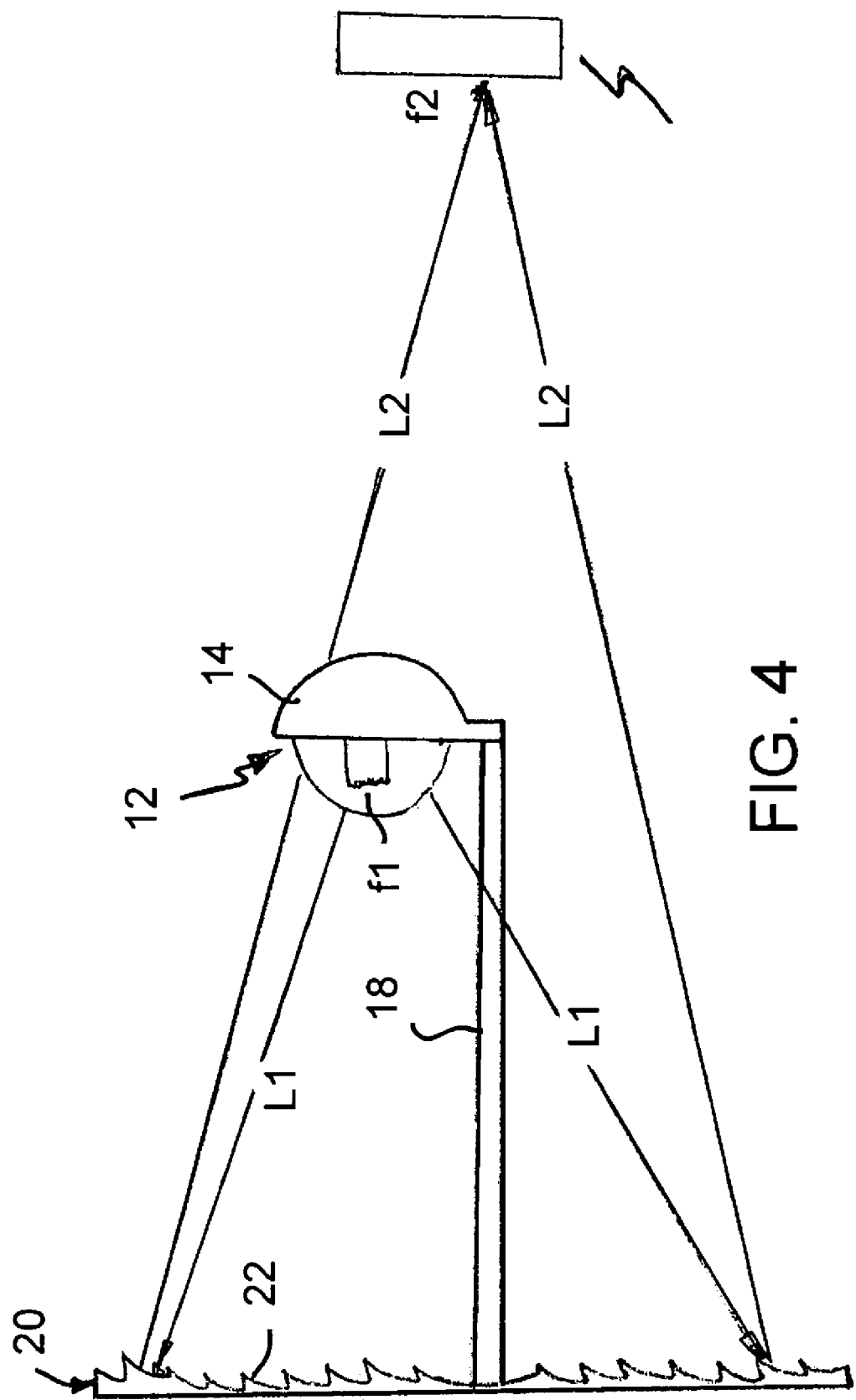
FIG. 4 is a side view of the invention.

FIG. 4 shows light source 12 disposed approximately at the first focal point F1 of the ellipse formed by the elliptical shape of reflective surface 22 of Fresnel mirror 20. Fresnel mirror 20 collects light from the light source and light reflected from reflector 14 and redirects and focuses the light as a luminous flux onto target 50 (schematically shown) which is disposed approximately at, or just inside of, the second focal point F2 of the ellipse.

The function of the elliptical reflective surface 22 is to reflect all light from F1 to F2.

A person of ordinary skill in the art would not have difficulty in designing a Fresnel mirror which distributes a luminous flux of reflected light onto the target positioned at the second focal point of the ellipse. The shape and dimensions of the Fresnel mirror for obtaining desired directions of reflected light can be designed with the use of a computer based on specified desired parameters, such as, the distance between the Fresnel mirror and illuminated target.

Unlike a conventional parabolic reflection that reflects light from its single focal point of the parabola into a beam of parallel lines emitted from the parabola, the elliptical reflector of the invention reflects lights from first focal point F1 to second focal point F2.

Figure 5:
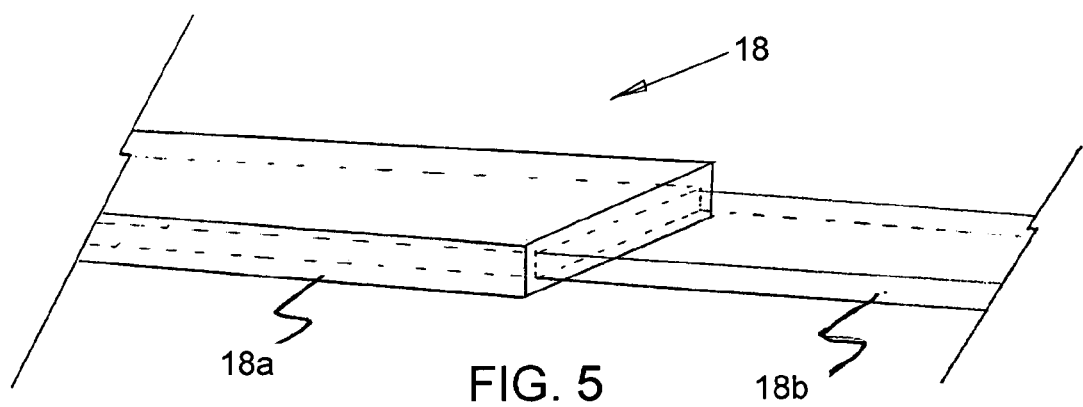
FIG. 5 is a perspective view of the strut of the invention.

Strut 18, as shown in FIG. 5, preferably has a telescopic structure, as is well-known in the art, which allows strut 18 to increase and decrease in length. The telescopic structure of strut 18 can consist of an outer beam or pipe 18a, an inner beam or pipe 18b which is slidably engageable in outer beam 18a and a conventional locking device (not shown) which, when released, allows inner beam 18b to slide outwardly or inwardly outer beam 18a for extending or contracting strut 18. The length of strut 18 can be fixed or adjusted to position light source 12 at approximately the first focal point F1 of the ellipse. Moving the light source does not affect the position of F2. The position of F1 and F2 are fixed by the elliptical curve of the Fresnel. Target 50 is approximately at the second focal point F2 of the ellipse. Other well-known mechanisms can also be used to adjust the length of strut 18. Strut 18 forms means that set the light source 12 at focal point F1.

Figure 6:
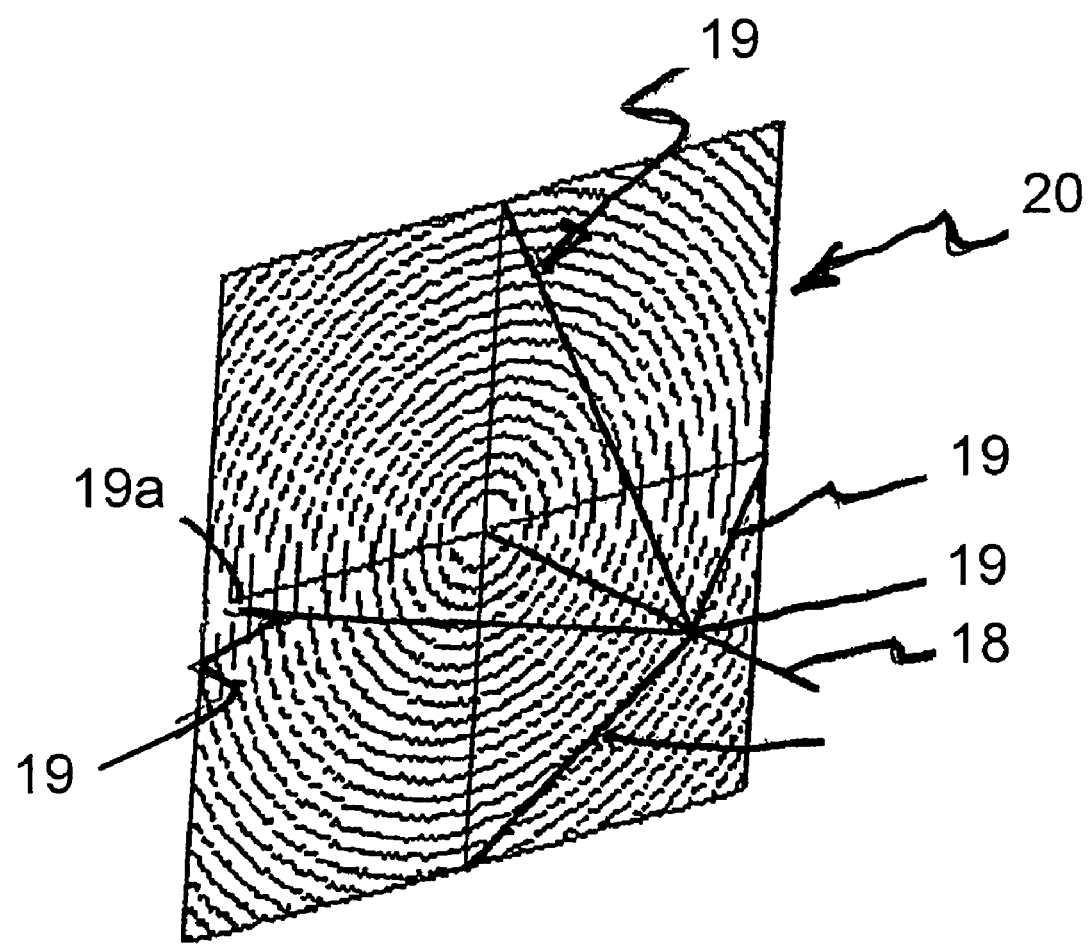
FIG. 6 is a perspective view illustrating secondary struts of the invention.

As shown schematically in FIG. 6, secondary struts 19, preferably four, extend from side edges 23 of Fresnel mirror 20 to strut 18. Secondary struts 19 have a proximate end 19a connected to Fresnel mirror 20 and a distal end 19b connected to strut 18, via conventional fastening devices or techniques, such as, screws, couplings, welds, etc. Secondary struts provide additional support for holding light source 12 and they keep the multiple Fresnel panels in co-planar alignment.

Referring to FIGS. 1 and 4, reflector 14 is disposed between light source 12 and target 50. Reflector 14 collects and projects light emanating from light source to Fresnel mirror 20. Reflector has preferably a hemispherical shape with an open end 14a which faces Fresnel mirror and a closed end 14b which faces target 50. Reflector 14 is preferably connected to strut 18 by well-known fasteners (not shown), i.e., bolts, screws and nuts, clamps, pins, rivets, etc. Reflector 14 can also be connected to light source 12 by the same fasteners.

Figure 7:
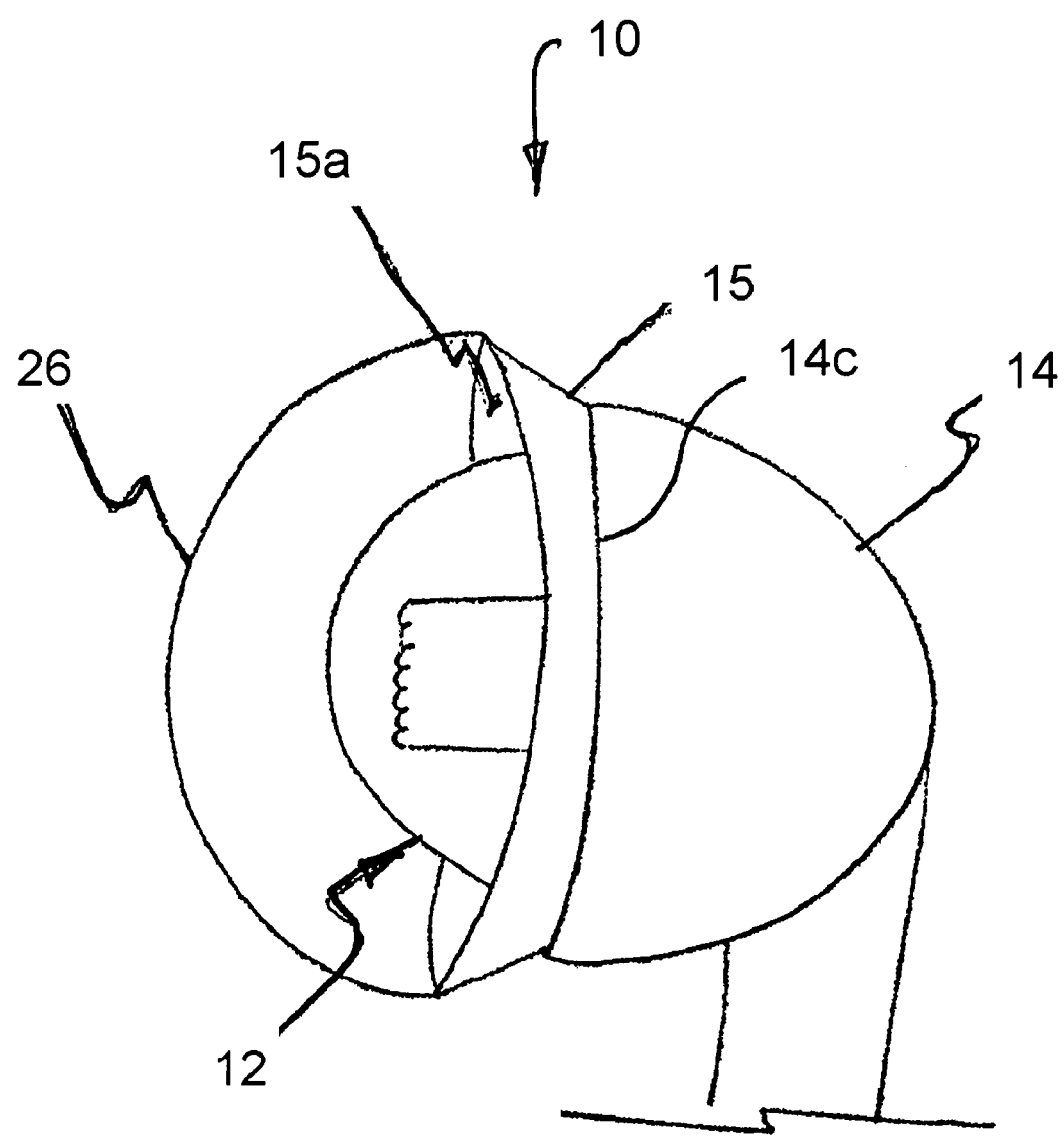
FIG. 7 is a perspective view of the diffuser and light source of the invention.

FIG. 7 displays a second embodiment of light apparatus 10 having a flange 15 that extends circumferentially on the outer edge 14c of open end of reflector 14. Flange 15 has a reflective surface 15a.

Diffuser 26 uniformly distributes reflected light to Fresnel mirror 20. Diffuser 26 connects to the edge of flange 15. Diffuser 26 preferably has a larger diameter than reflector 14 so that it completely covers the open end of reflector 14. Reflective surface 15a of flange 15 prevents light from reflecting from the inside of diffuser 26 and spilling onto target 50.

Figure 8:
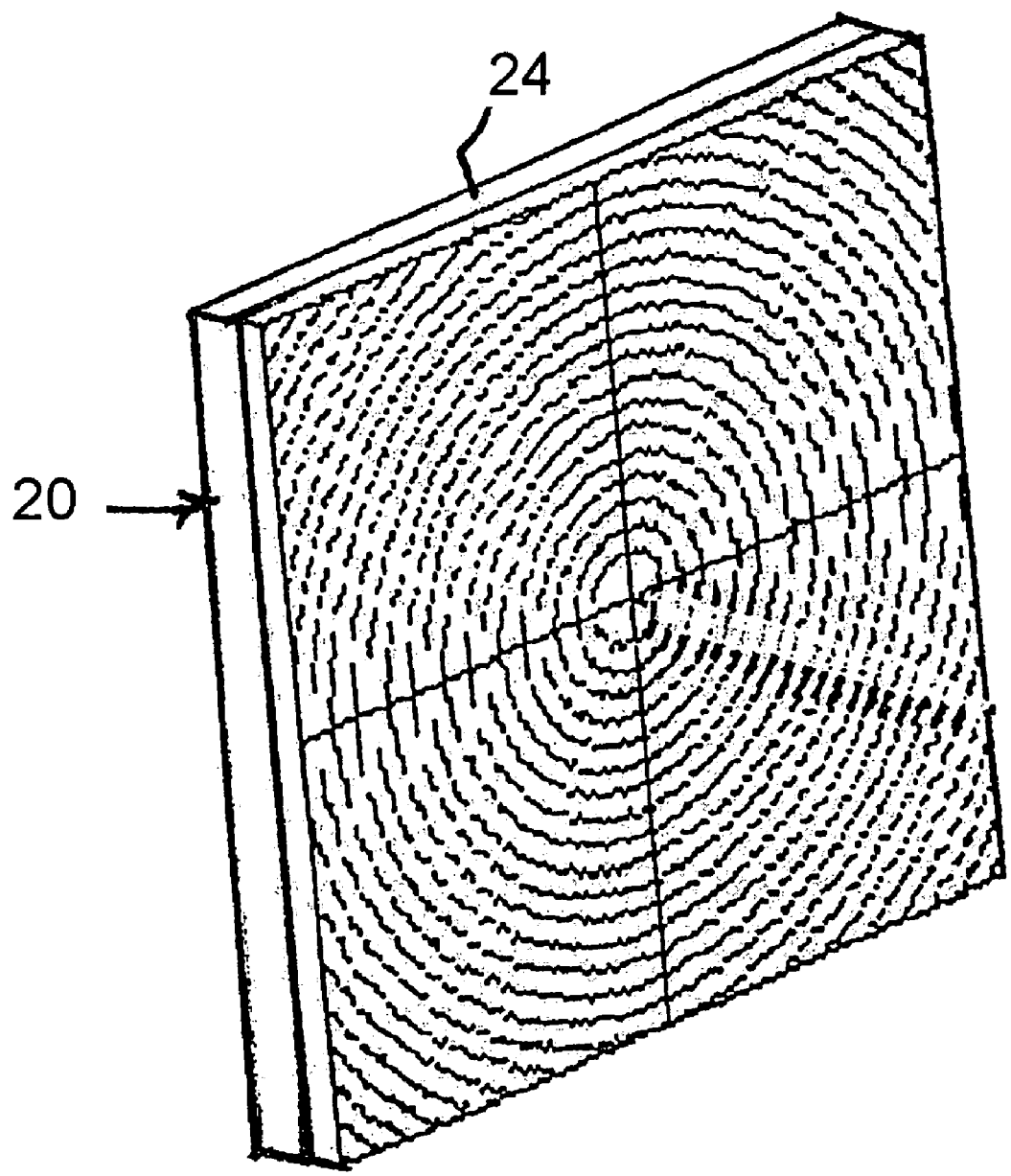
FIG. 8 is a perspective view of the panel and Fresnel mirror of an embodiment of the invention.

In a third embodiment of the present invention, as shown in FIG. 8, Fresnel mirror 20 mounts onto a panel 24. Fresnel mirror 20 is preferably removable from panel 24 to allow interchanging of Fresnel mirrors which have different focal lengths. Well-known attachment means, such as Velcro® or other conventional fasteners (not shown), allow for easy removal and mounting of a Fresnel mirror onto panel. There are several advantages with interchanging Fresnel mirrors with different focal lengths. For example, Fresnel mirrors having a longer or shorter focal length, whichever is desired, can be substituted without having to relocate lighting apparatus 10 and/or target 50. Relocating lighting apparatus 10 and/or target 50 may be, in many instances, not possible and/or not economically feasible or may result in an undesirable position of the illuminated area or change in the softness of the light. For example, the environment may have limited locations for positioning lighting apparatus 10 due to small or limited space, such as, in a store display window. Therefore, the range of reach of the reflected rays onto target 50 can be varied.

Figure 9C:
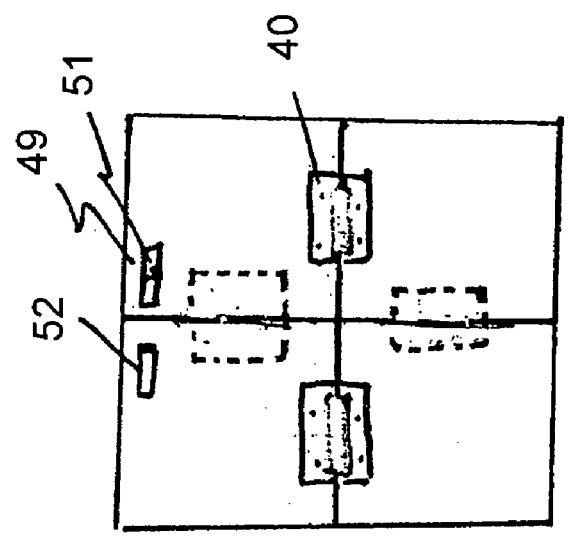
FIGS. 9a, 9b, 9c is a respective front view, side view and rear view of the Fresnel mirror of the invention having multiple sections.
Figure 9B:
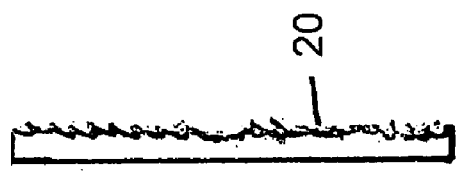
Figure 9A:
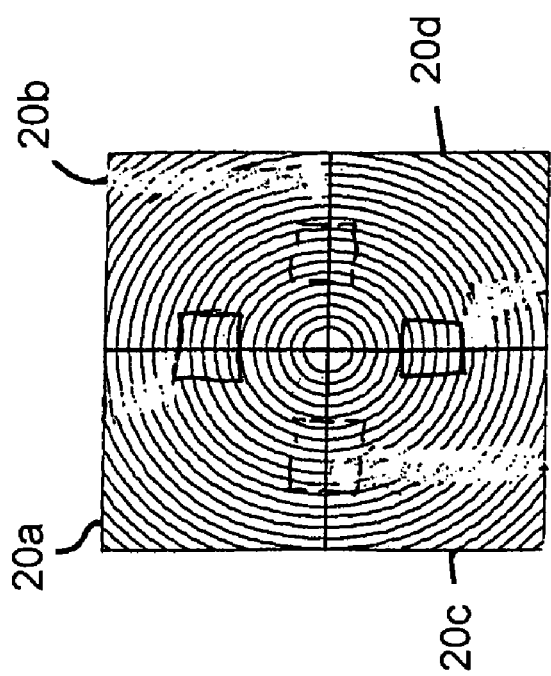

FIG. 9a shows a fourth embodiment of the light apparatus 10 having Fresnel mirror 20 comprised of four separate sections 20a, 20b, 20c, 20d. The number of sections of the Fresnel mirror 20 can be less than or more than four.

Sections 20a, 20b, 20c, 20d are pivotally connected, preferably by a hinge device 40, so that Fresnel mirror 20 can be compactly folded and stored when not in use. Other typical pivoting connectors well-known in the art can also be used such as a central pivot of known design for other photographic and/or lighting purposes.

Hinge device 40, as shown in FIGS. 9c and 10, comprise two hinge leafs 41, 42 with aligned sleeves 43 and a pin or screw 44 which is journaled in sleeves 43 to connect hinge leafs 41. Hinge device 40 is disposed between adjoining ends of sections 20a, 20b, 20c, 20d with two hinges on one side and two on the opposite side as shown in FIG. 9c. Only three hinges are necessary, the one between the two "loose" panels is not required, if each secondary strut fastens two adjacent panels together. The struts keep the multiple panels aligned and co-planar.

Hinge device 40 provides easy transport and storage of light apparatus 10 since sections can be folded to overlap one another. Pin 44 is removable from sleeves 43 to allow complete separation of sections 20a, 20b, 20c, 20d. Removing pin 44 from only one hinge device 40 will separate two adjacent sections to facilitate the folding of two of the hinges on one side of the mirror to fold the assembly in half. With the one pin removed the remaining hinge on the opposite side is folded n the opposite direction to fold the assembly in half once more for a compact size of one quarter the original area. Removable pins, however, may be unnecessary since "captive" pin designs are available.

A latch 49, as shown schematically in FIG. 9c, or other conventional locking device, is mounted on the non-reflective surface side 23 of Fresnel mirror 20 for locking sections 20a, 20b, 20c, 20d in their open or unfolded position. Latch 49, for example, comprises a slidable rod 51 mounted on at least one of the sections and an axially aligned sleeve 52 mounted on an adjacent section. Rod 51 engages sleeve 52 to lock sections in their open position. To fold sections, rod is disengaged from sleeve 52.

Figure 12:
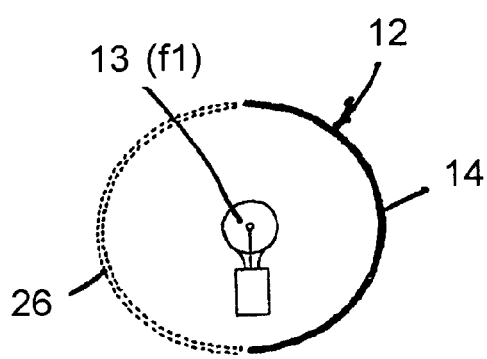
FIGS. 12, 13, 14 and 15 are sectional views of secondary reflectors in light sources of the invention.

Referring to FIGS. 12–15, various shapes for the secondary reflector 14 are shown. In FIG. 12, the reflector 14 is simply a hemispherical structure with reflecting inner surface having a center of curvature corresponding to the filament 13, so that all light from filament 13 is reflected from reflector 14, through a diffuser 26 of clear or frosted glass or other translucent material, forming a second hemisphere that completes the sphere begun by reflector 14.

Figure 13:
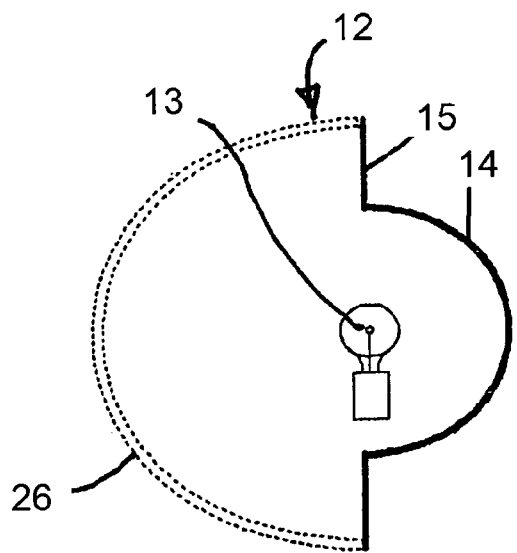

In the embodiment of FIG. 13, an annular flange 15 which is reflective on the inside surface, extends radially outwardly from the filament 13, which is approximately at focal point F1, and increases the reflective area of reflector 14 which has its central hemispherical structure.

Figure 14:
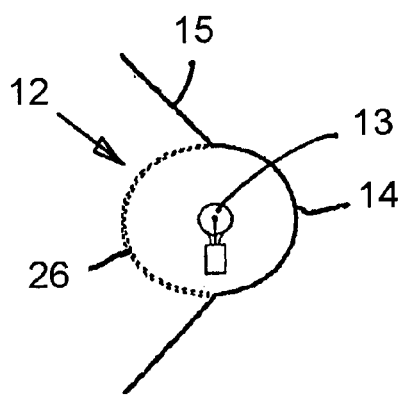

In the embodiment of FIG. 14, flange 15 which is non-reflective on the inside surface, is inclined forwarding and in a direction toward the Fresnel mirror (not shown).

Figure 15:
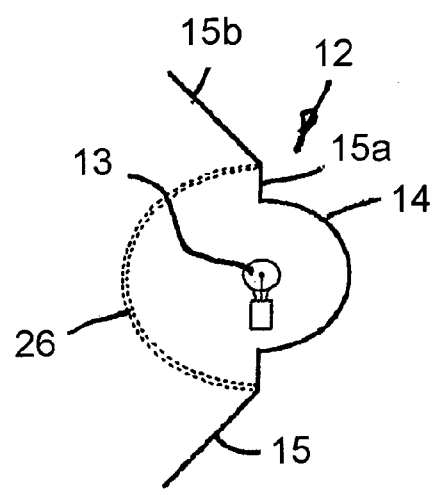

FIG. 15 shows a two-part flange having a radial portion 15a which is reflective on the inside surface and has a forwardly inclined conical portion 15b.

Figure 11:
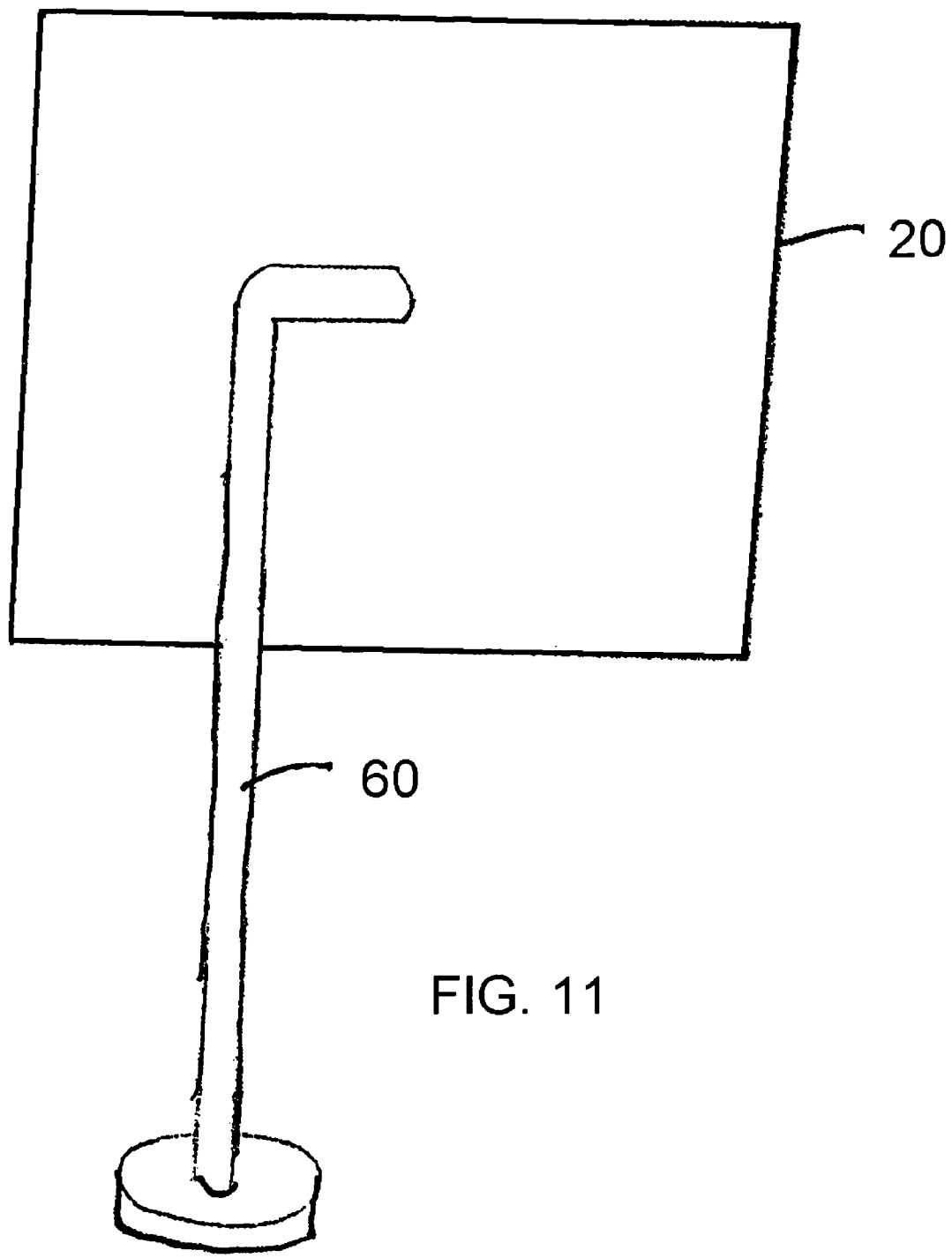
FIG. 11 is a perspective view of a stand of the invention.

A stand 60, as shown in FIG. 11, is connected by conventional fastening means to the non-reflective side 23 of Fresnel mirror 20. Stand 60 is preferably removable from Fresnel mirror 20 to facilitate storage and transport of lighting device 10. Stand 60 is also preferably connected to Fresnel mirror via a knuckle joint (not shown) so that Fresnel mirror can be tilted in various directions.

While specific embodiments of the invention have been shown and described in detail to illustrate the application of the principles of the invention, it will be understood that the invention may be embodied otherwise without departing from such principles.

What is claimed is:

1. A lighting device for lighting a target, the lighting device comprising:
   a Fresnel mirror having a reflective surface facing the target, the Fresnel mirror having a center and a central optical axis;
   a light source on the central optical axis and between the target and the Fresnel mirror;
   a secondary reflector on the central optical axis and between the light source and the subject, for preventing light from the light source from directly reaching the target and for reflecting light from the light source back toward the Fresnel mirror;
   a center strut having one end connected to the center of the Fresnel mirror and an opposite end connected to the light source for setting a spacial relationship between the light source and the Fresnel mirror; and
   at least one stabilizing strut connected from a side edge of the Fresnel mirror away from the center of the Fresnel mirror, to a point along the center strut for keeping the light source and the center strut on the central optical axis of the Fresnel mirror.

2. The lighting device of claim 1, wherein the Fresnel mirror has at least two sections which are pivotally connected to each other and means for folding the at least two sections of the Fresnel mirror against each other.

3. The lighting device of claim 2, wherein the means for folding comprises a hinge.

4. The lighting device of claim 1, wherein the at least two sections of the Fresnel mirror have the approximate same shape and size.

5. The lighting device of claim 1, wherein the Fresnel mirror is polygonal.

6. The lighting device of claim 1, further comprising a panel and a means for removably mounting the Fresnel mirror onto the panel.

7. The lighting device of claim 6, wherein the means for removably mounting the Fresnel mirror onto the panel is a hook and loop fastener.

8. The lighting device of claim 1, wherein the center strut has a telescopic frame.

9. The lighting device of claim 1, further comprising a plurality of stabilizing struts extending from spaced locations along the side edge of the Fresnel mirror to the center strut.

10. The lighting device of claim 1, wherein the secondary reflector has a hemispherical shape.

11. The lighting device of claim 1, wherein the secondary reflector further comprising a circumferential flange which is biased from the hemispherical shaped portion.

12. The lighting device of claim 1, further comprising a diffuser disposed between the Fresnel mirror and the light source and connected to the secondary reflector.

13. A lighting device for lighting a target, the lighting device comprising:
   a light source;
   a Fresnel mirror having a reflective surface disposed in a functional spacial relationship relative to the light source, curve the Fresnel mirror having at least two sections which are pivotally connected to each other;
   a center strut being connected to the center of the Fresnel mirror at one end and to the light source at its other end, for setting the spacial relationship between the light source and the Fresnel mirror;
   a secondary reflector partially surrounding the light source and connected to the center strut with the light source, the reflector reflecting light emitted from the light source toward the Fresnel mirror and preventing light from the light source from directly reaching the target; and
   a plurality of stabilizing struts extending from spaced locations along the side edge of the Fresnel mirror away from the center of the Fresnel mirror, to a point along the center strut for keeping the light source and the center strut on a central axis of the Fresnel mirror.

14. The lighting device of claim 13, wherein the center strut is extendable or reducible in length so that the light source can be positioned approximately at a focal point of the Fresnel mirror.

* * * * *